United States Patent
Nakajima

(10) Patent No.: US 8,181,063 B2
(45) Date of Patent: May 15, 2012

(54) COMPUTER DEVICE, CONTINUING OPERATION METHOD FOR COMPUTER DEVICE, AND PROGRAM

(75) Inventor: Eiji Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 123 days.

(21) Appl. No.: 12/391,576

(22) Filed: Feb. 24, 2009

(65) Prior Publication Data

US 2009/0217087 A1 Aug. 27, 2009

(30) Foreign Application Priority Data

Feb. 27, 2008 (JP) ................................ 2008-046087

(51) Int. Cl.
*G06F 11/00* (2006.01)
(52) U.S. Cl. ........................................... 714/11; 714/13
(58) Field of Classification Search .................... 714/11, 714/13
See application file for complete search history.

(56) References Cited

U.S. PATENT DOCUMENTS

| | | | |
|---|---|---|---|
| 5,649,090 A * | 7/1997 | Edwards et al. ............... 714/10 |
| 6,490,657 B1 * | 12/2002 | Masubuchi et al. ........... 711/135 |
| 6,516,429 B1 * | 2/2003 | Bossen et al. ................. 714/47 |
| 6,622,263 B1 * | 9/2003 | Stiffler et al. ................. 714/13 |
| 6,832,329 B2 * | 12/2004 | Ahrens et al. ................. 714/5 |
| 7,032,123 B2 * | 4/2006 | Kane et al. .................... 714/5 |
| 7,114,095 B2 * | 9/2006 | Milojicic et al. ............. 714/13 |
| 7,139,933 B2 * | 11/2006 | Hsu et al. ...................... 714/6 |
| 7,162,587 B2 * | 1/2007 | Hiken et al. ................. 711/135 |
| 7,263,581 B2 * | 8/2007 | Chen ............................ 711/113 |
| 7,302,608 B1 * | 11/2007 | Acharya et al. .............. 714/13 |
| 7,484,118 B2 * | 1/2009 | Rebmann et al. ............ 714/13 |
| 7,600,152 B2 * | 10/2009 | Ash et al. ..................... 714/10 |
| 7,613,948 B2 * | 11/2009 | Hillman et al. .............. 714/11 |
| 7,694,174 B2 * | 4/2010 | Barlow et al. ................ 714/7 |
| 7,716,520 B2 * | 5/2010 | Tabei et al. .................. 714/10 |
| 2002/0133735 A1 * | 9/2002 | McKean et al. .............. 714/5 |
| 2003/0074598 A1 * | 4/2003 | Bossen et al. ................ 714/6 |
| 2006/0083102 A1 * | 4/2006 | Ghanem et al. ............. 365/232 |
| 2009/0177919 A1 * | 7/2009 | Bose et al. ................... 714/10 |

FOREIGN PATENT DOCUMENTS

JP 2003256396 A 9/2003

* cited by examiner

*Primary Examiner* — Marc Duncan

(57) ABSTRACT

A computer device that includes a plurality of processor boards each provided with a processor, a memory, and a chipset, includes a first processor board that makes data in a cache, which have become unfixed as a result of an uncorrectable failure, invalid when the uncorrectable failure occurs on the first processor board in operation, and switches from the first processor board to a second processor board for replacement, and the second processor board that re-executes an instruction that was being executed in the first processor board when the failure occurred.

17 Claims, 4 Drawing Sheets

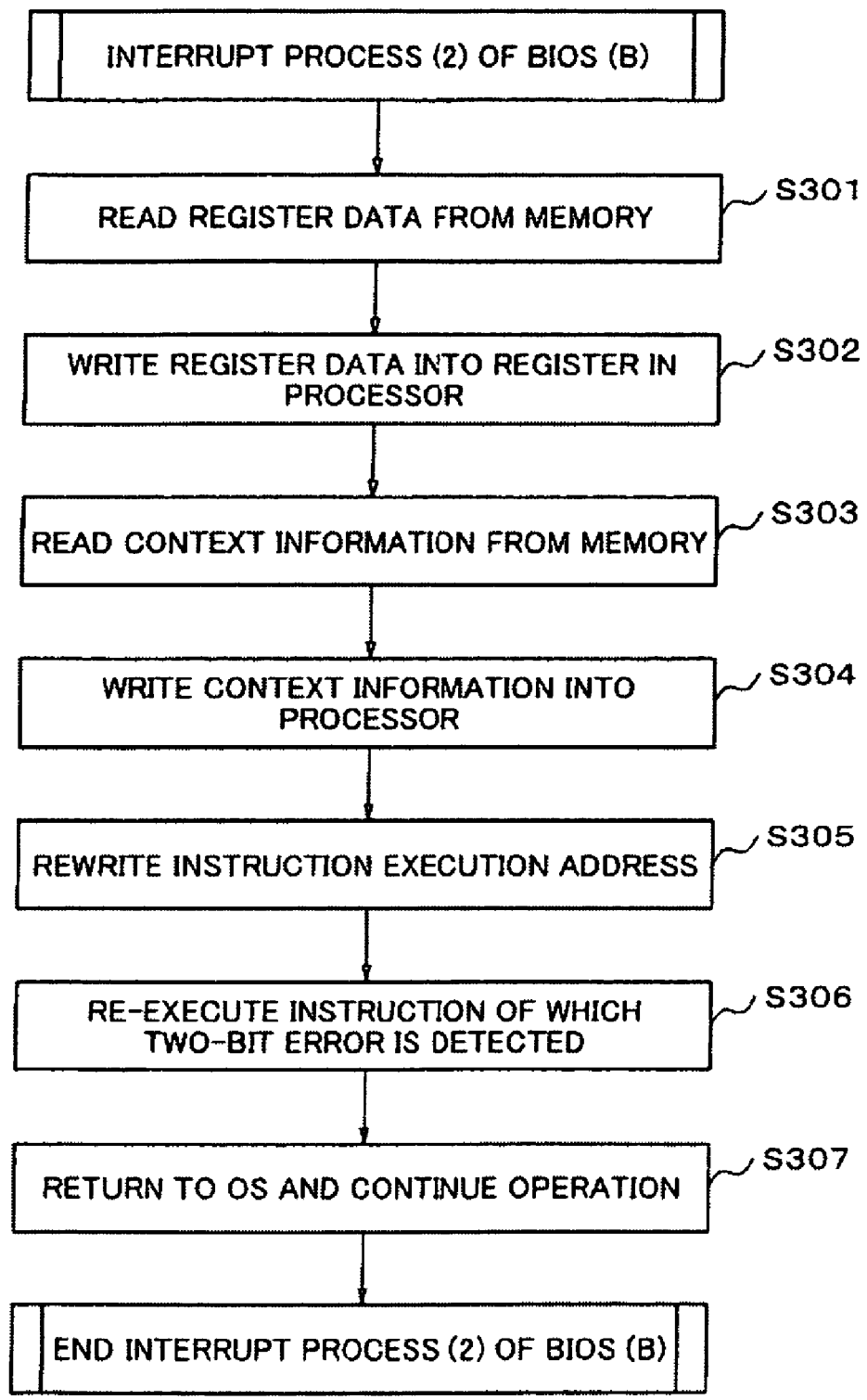

COMPUTER DEVICE, CONTINUING OPERATION METHOD FOR COMPUTER DEVICE, AND PROGRAM

This application is based upon and claims the benefit of priority from Japanese patent application No. 2008-046087, filed on Feb. 27, 2008, the disclosure of which is incorporated herein in its entirety by reference.

TECHNICAL FILED

The present invention relates to a computer device including a plurality of processor boards on which a processor, a memory and a chipset are mounted and particularly relates to a computer device, a continuing operation method for a computer device, and a program which is able to continue its operation when an uncorrectable failure occurs.

BACKGROUND ART

When a two-bit error on a bus on a processor board occurs in data read from a memory in a computer device in operation, a method described below has been used to deal with the error.

The two-bit error can not be corrected, namely, it is an uncorrectable failure. Therefore, when a two-bit error occurs or when unfixed data caused by a two-bit error in a cache is referred to, it is detected, the computer device is stopped, the failed processor board is automatically disconnected, and then the operation is restarted by using another processor board. After that, the computer device is stopped again and the failed processor board is replaced.

For this reason, in the computer device, when an uncorrectable failure occurs on the processor board, it is necessary to detect the failure certainly and to restart the operation in a short period of time.

However, because a computer device becomes widely used and plays an important role as a social infrastructure, an improvement in the continuous operation performance and the fault tolerance performance of the computer device becomes important. For this reason, a new method which enables the continuous operation of the computer device and the replacement of the failed processor board without stopping the computer device even when uncorrectable failure occurs is required.

For example, Japanese Patent Application Laid-Open No. 2003-256396 discloses a technology which makes the continuous operation of a computer device possible without stopping the computer device when a failure occurs in the computer device.

In a computer device described in Japanese Patent Application Laid-Open No. 2003-256396, when a correctable failure such as an intermittent failure occurs, data stored in a memory and internal information on a processor on a processor board in which the failure occurs are copied onto a memory and a processor on a processor board for replacement. The processor board is switched from the processor board in which the failure occurs to the processor board for replacement. As a result, the operation is continued without stopping the computer device.

SUMMARY

An exemplary object of the invention is to provide a computer device, a continuing operation method for a computer device, and a program which is able to continue its operation without stopping the computer device even when an uncorrectable failure occurs.

A computer device that includes a plurality of processor boards each provided with a processor, a memory, and a chipset, includes a first processor board that makes data in a cache, which have become unfixed as a result of an uncorrectable failure, invalid when the uncorrectable failure occurs on the first processor board in operation, and switches from the first processor board to a second processor board for replacement, and the second processor board that re-executes an instruction that was being executed in the first processor board when the failure occurred.

A continuing operation method for a computer device that includes a plurality of processor boards each provided with a processor, a memory, and a chipset, includes making data in a cache, which have become unfixed as a result of uncorrectable failure, invalid when the uncorrectable failure occurs on a first processor board in operation, switching from the first processor board to a second processor board for replacement, and re-executing an instruction that was being executed in the first processor board when the failure occurred, on the second processor board.

A computer readable medium embodying a program, the program causing a computer device that includes a plurality of processor boards each provided with a processor, a memory, and a chipset, to perform a method includes making data in a cache, which have become unfixed as a result of uncorrectable failure, invalid when the uncorrectable failure occurs on a first processor board in operation, switching from the first processor board to a second processor board for replacement, and re-executing an instruction that was being executed in the first processor board when the failure occurred, on the second processor board.

A computer device that includes a plurality of processor boards each provided with a processor, a memory, and a chipset, includes means for making data in a cache, which have become unfixed as a result of uncorrectable failure, invalid when the uncorrectable failure occurs on a first processor board in operation, and switching from the first processor board to a second processor board for replacement, and means for re-executing an instruction that was being executed in the first processor board when the failure occurred, on the second processor board.

A continuing operation method for a computer device that includes a plurality of processor boards each provided with a processor, a memory, and a chipset, includes a step for making data in a cache, which have become unfixed as a result of uncorrectable failure, invalid when the uncorrectable failure occurs on a first processor board in operation, a step for switching from the first processor board to a second processor board for replacement, and a step for re-executing an instruction that was being executed in the first processor board when the failure occurred, on the second processor board.

BRIEF DESCRIPTION OF THE DRAWINGS

Exemplary features and advantages of the present invention will become apparent from the following detailed description when taken with the accompanying drawings in which:

FIG. 4 is an exemplary flowchart illustrating a detailed flow of an interrupt process (2) in the processes shown in FIG. 2.

EXEMPLARY EMBODIMENT

An exemplary embodiment will be described in detail with reference to a drawing.

Figure 1:
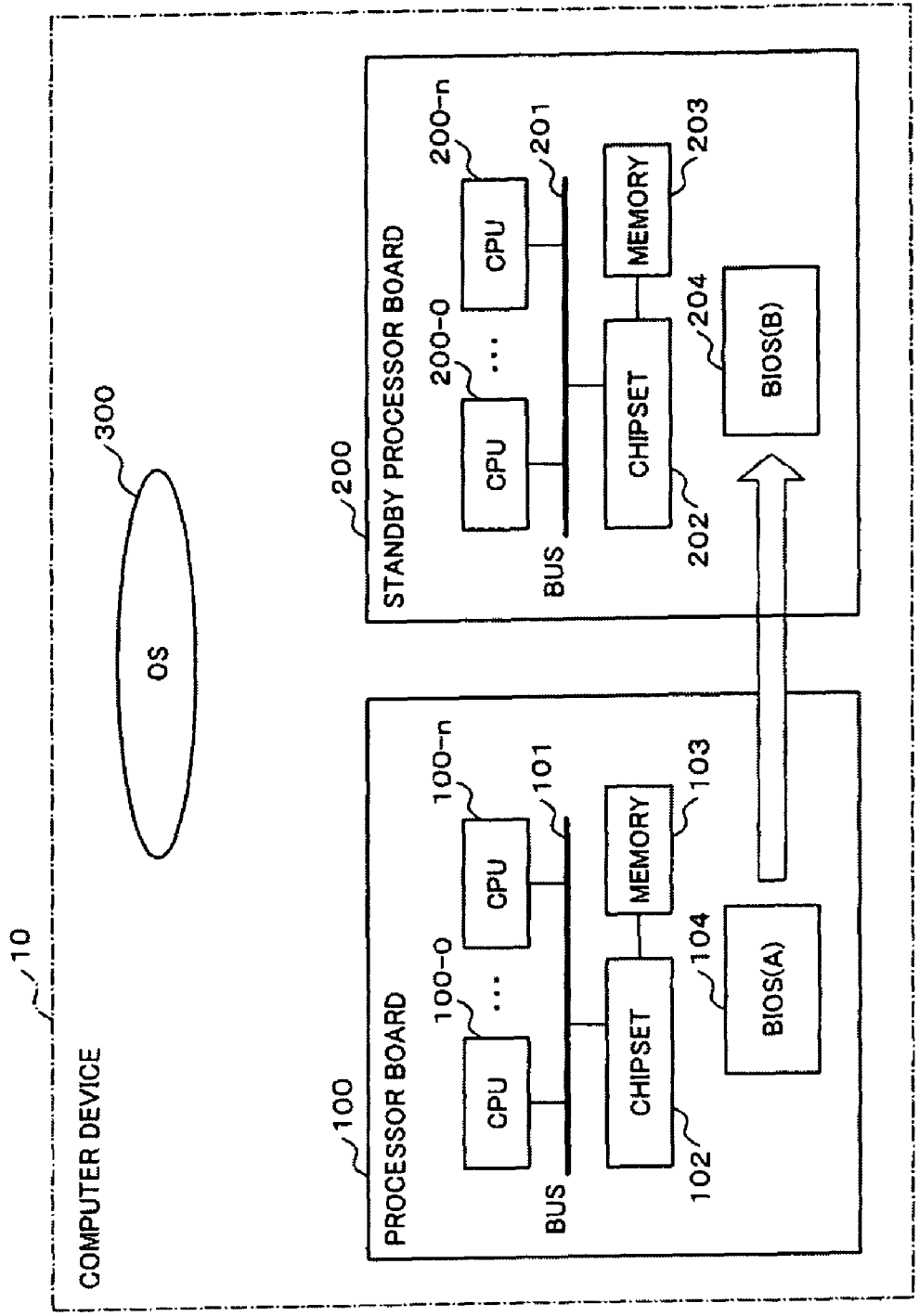
FIG. 1 is an exemplary block diagram illustrating a configuration of a computer device of a first exemplary embodiment.

FIG. 1 is an exemplary block diagram illustrating a configuration of a computer device in a first exemplary embodiment. In FIG. 1, computer device 10 in the exemplary embodiment includes processor board 100, standby processor board 200 and OS (operating system) 300.

Processor board 100 includes a plurality of processors (CPU 100-0 to CPU 100-n), chipset 102 connected to processors (CPU 100-0 to CPU 100-n) via bus 101, and memory 103.

Similarly, standby processor board 200 also includes a plurality of processors (CPU 200-0 to CPU 200-n), chipset 202 connected to processors (CPU 2.00-0 to CPU 200-n) via bus 201, and memory 203. When a failure occurs in operating processor board 100, standby processor board 200 continues an operation of a processor on processor board 100.

Further, CPUs 100-0 to 100-n that are processors on processor board 100 and CPUs 200-0 to 200-n that are processors on standby processor board 200 include a cache, respectively.

A configuration in which one processor board 100 and one standby processor board 200 are included is used for an explanation of the exemplary embodiment for ease of explanation, but a configuration in which a plurality of processor boards are included is available.

In computer device 10, in a normal operation state, operating system (OS) 300 operates on processor board 100.

BIOS (Basic Input/Output System) (A) 104 is installed on processor board 100 as firmware, and BIOS (B) 204 is installed on standby processor board 200 as firmware.

BIOS (B) 204 is in a standby state on standby processor board 200 and waits for an interrupt from BIOS (A) 104 on processor board 100.

Operation when an uncorrectable failure occurs in computer device 10 of the exemplary embodiment will be described in detail with reference to flowcharts shown in FIGS. 2 to 4.

It is assumed that when computer device 10 is operating, namely, OS 300 is operating on processor board 100, a two-bit error (uncorrectable failure) on bus 101 occurs in data read out from memory 103 by a certain CPU (in the explanation hereinafter, it is CPU (0) 100-1 shown in FIG. 1) on processor board 100. In this case, unfixed data which have become unfixed as a result of the two-bit error remains in the cache in the CPU.

Figure 2:
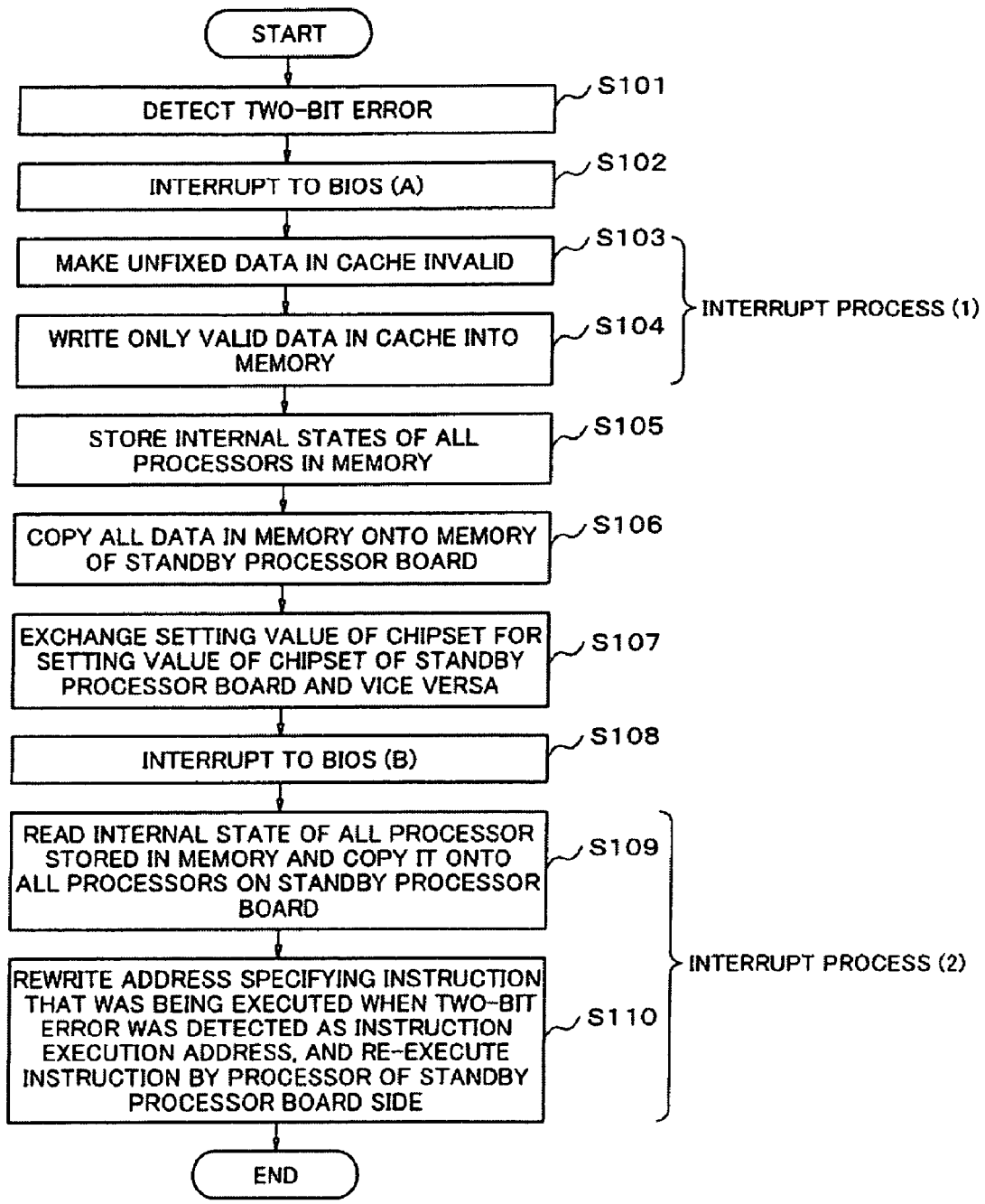
FIG. 2 is an exemplary flowchart illustrating operation when an uncorrectable failure occurs in a computer device of the first exemplary embodiment.

FIG. 2 is an exemplary flowchart illustrating operation when the uncorrectable failure occurs in the computer device of the first exemplary embodiment. In FIG. 2, when CPU (0) 100-1 detects the two-bit error (Step S101), it interrupts to BIOS (A) 104 (Step S102).

BIOS (A) 104 executes the interrupt process (1) in order to make the unfixed data in the cache of CPU 100-0 invalid (Step S103), and write only valid data in the cache into memory 103 (Step S104).

Here, the content of the processes in steps S103 and S104 of the interrupt process (1) executed by BIOS (A) 104 will be described in detail by using the flowchart shown in FIG. 3. FIG. 3 is an exemplary flowchart illustrating the detailed flow of the interrupt process (1) in the processes shown in FIG. 2.

As mentioned above, when the CPU detects the two-bit error, it interrupts to BIOS (A) 104 and BIOS (A) 104 starts to execute the interrupt process (1).

In the interrupt process (1) executed by BIOS (A) 104, logs of the two-bit error are collected (Step S201) and the collected logs are analyzed (Step S202).

Figure 3:
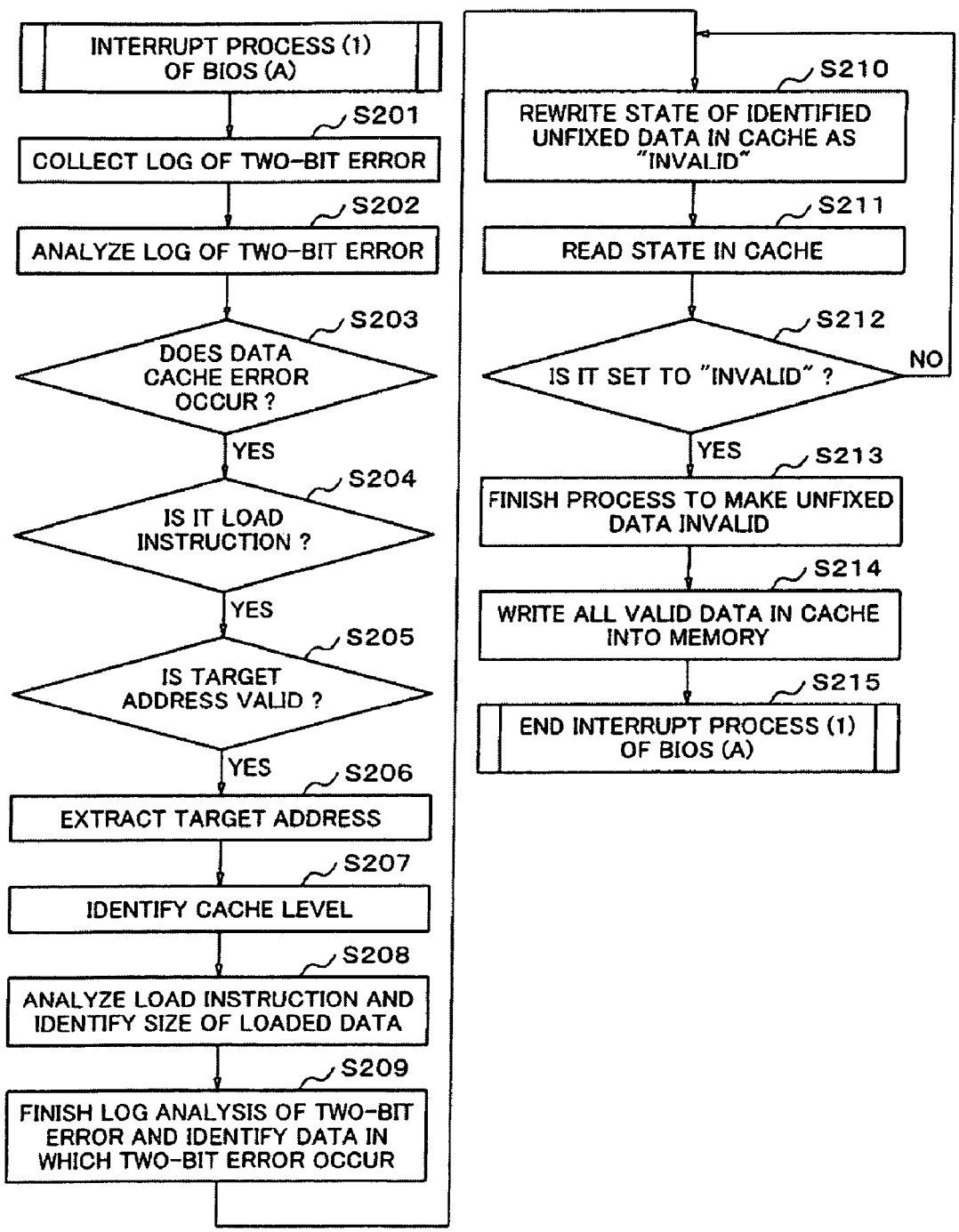
FIG. 3 is an exemplary flowchart illustrating a detailed flow of an interrupt process (1) in the processes shown in FIG. 2.

In the log analysis of the interrupt process (1) executed by BIOS (A) 104, specifically, as shown in FIG. 3, whether a data cache error occurs (Step S203), whether it is a LOAD instruction to load data from a memory (Step S204), and whether a target address on the memory is valid (Step S205) are judged. When one of the judgment results in the steps from step S203 to step S205 is "NO" judgment, the interrupt process (1) executed by BIOS (A) 104 is ended because data in which the two-bit error occurs in the data cache can not be identified.

When all the judgment results in the steps from step S203 to step S205 are "YES" judgments, a target address is extracted from the log in the interrupt process (1) executed by BIOS (A) 104 (Step S206).

A cache level is identified in the interrupt process (1) executed by BIOS (A) 104 (Step S207).

The size of the data loaded from the memory is identified by analyzing an operand of the LOAD instruction in the interrupt process (1) executed by BIOS (A) 104 (Step S208).

Here, in the interrupt process (1) executed by BIOS (A) 104, the log analysis of the two-bit error is finished and the data in which the two-bit error occurs in the cache is identified according to the target address, the cache level and the size of the loaded data (Step S209).

Namely, in the interrupt process (1) executed by BIOS (A) 104, it is identified that the unfixed data which have become unfixed as a result of the two-bit error whose size is equal to the data size and the target address are held together in the data cache at the identified cache level.

Next, in the interrupt process (1) executed by BIOS (A) 104, a state of the identified unfixed data in the cache is rewrote as "Invalid" (Step S210). In this step S210, the unfixed data in the cache is made invalid.

In order to execute a process in this step S210, it is necessary to identify the data cache, the cache level, the target address, and the data size in the interrupt process (1) executed by BIOS (A) 104. Namely, it is necessary to execute the steps of steps S202 to S205, step S206, step S207 and step S208 and also it is necessary to identify the data in which the two-bit error occurs in step S209 in advance in the interrupt process (1) executed by BIOS (A) 104.

Next, the state of the identified unfixed data in the cache is read out in the interrupt process (1) executed by BIOS (A) 104 (Step S211).

It is judged whether the state of the identified unfixed data in the cache is set to "Invalid" in the interrupt process (1) executed by BIOS (A) 104 (Step S212).

When it is confirmed that the state is changed to "Invalid", a process to make the unfixed data which have become unfixed as a result of the two-bit error invalid is finished in the interrupt process (1) executed by BIOS (A) 104 (Step S213).

Finally, the valid data in the cache is written into memory 103 (Step S214), and the process is ended in the interrupt process (1) executed by BIOS (A) 104 (Step S215).

Next, the operation in the steps after step S103 and step S104 shown in FIG. 2 is described.

BIOS (A) 104 stores information representing internal states of all processors on processor board 100 (including register data stored in a register in the processor and context information on a process which is operated) in memory 103 (Step S105).

At that time, when a multiprocessor configuration is used, BIOS (A) 104 transmits an interrupt signal to all the other processors in order to make all the other processors transfer to the interrupt process executed by BIOS (A) 104 and store information representing the internal states of all the processors (including register data stored in the register in the processor and the context information on a process which is operated) in memory 103.

Next, BIOS (A) 104 copies all the data on memory 103 on processor board 100 onto memory 203 on standby processor board 200 (Step S106).

At that time, BIOS (A) 104 copies all the data on memory 103 on processor board 100 onto memory 203 on standby processor board 200 by using a memory copy function provided in chipset 102 on processor board 100.

Next, BIOS (A) 104 exchanges a setting value of chipset 102 on processor board 100 for a setting value of chipset 202 on standby processor board 200 and vice versa (Step S107).

In this step S107, for example, an address assigned to memory 103 on processor board 100 is exchanged for an address assigned to memory 203 on standby processor board 200.

Next, BIOS (A) 104 interrupts to BIOS (B) 204 on standby processor board 200 (Step S108) and it makes all the processors on standby processor board 200 perform the interrupt process (2) executed by BIOS (B) 204.

BIOS (B) 204 reads out the register data among the information representing the internal states of all the processors that are stored in memory 203 by BIOS (A) 104 in step S106 and copies it onto registers of all the processors on standby processor board 200 (Step S109).

BIOS (B) 204 copies the context information on the process among the information representing the internal states of all the processors that are stored in memory 203 by BIOS (A) 104 in step S106 onto all the processors on standby processor board 200 (Step S109).

At that time, because the address specifying an instruction that was being executed when the two-bit error was detected remains in the context information on the process, BIOS (B) 204 rewrites that address as an instruction execution address. BIOS (B) 204 re-executes the instruction by a processor on standby processor board 200 (Step S110). By re-executing this instruction, the data in which the two-bit error occurs is read from memory 203 again. Accordingly, the computer device is able to continue its operation.

Here, the content of the processes in steps S109 and S110 will be described in detail by using a flowchart shown in FIG. 4. FIG. 4 is an exemplary flowchart illustrating a detailed flow of the interrupt process (2) in the processes shown in FIG. 2.

When BIOS (A) 104 interrupts to BIOS (B) 204 on standby processor board 200 in step S108, all the processors on standby processor board 200 become possible to perform the interrupt process (2) executed by BIOS (B) 204.

First, in the interrupt process (2) executed by BIOS (B) 204, the register data among the information representing the internal states of all the processors stored in memory 203 by BIOS (A) 104 in step S106 is read out (Step S301).

Next, the read register data is written into registers in all the processors on standby processor board 200 in the interrupt process (2) executed by BIOS (B) 204 (Step S302).

Next, the context information on the process among the information representing the internal states of all the processors stored in memory 203 by BIOS (A) 104 in step S106 shown in FIG. 1 is read out in the interrupt process (2) executed by BIOS (B) 204 (Step S303).

The read context information on the process is written into the insides of all the processors on standby processor board 200 in the interrupt process (2) executed by BIOS (B) 204 (Step S304).

Here, the context information that is written into the processors are information on the context, such as an instruction restart address, a data pointer and a stack pointer, that were being used when the two-bit error was detected, during operation of OS 300.

In the interrupt process (2) executed by BIOS (B) 204, the address specifying an instruction that was being executed when the two-bit error was detected, that is the instruction restart address stored in the memory as the context information, is rewritten into an instruction execution address register (Step S305).

The instruction that was being executed when the two-bit error was detected is re-executed by executing the instruction specified by the address in the instruction execution address register, in the interrupt process (2) executed by BIOS (B) 204 (Step S306). By re-executing this instruction, the data in which the two-bit error occurs is read from memory 203 again. Accordingly, the computer device is able to continue its operation.

After that, in the interrupt process (2) executed by BIOS (B) 204, a control is returned to OS 300 (Step S307). Namely, standby processor board 200 restarts the operation of OS 300 and the operation of the computer device is continued.

As mentioned above, by cooperation between BIOS (A) 104 on processor board 100 and BIOS (3) 204 on standby processor board 200, the unfixed data which have become unfixed as a result of the two-bit error is made invalid and information representing the internal state of the processor and all the data on the memory are copied from processor board 100 onto standby processor board 200. BIOS (B) 204 on standby processor board 200 rewrites the address specifying an instruction that was being executed when the two-bit error was detected as the instruction execution address, and re-executes the instruction. Accordingly, the data in which the two-bit error occurs is read from the memory again and the operation of OS 300 is restarted on standby processor board 200 side.

By the above method, the first exemplary embodiment has an advantage in which even when the two-bit error on the bus in the processor board occurs in the data read from the memory when the computer device operates, the computer device is able to continue its operation by using a processor that normally operates without stopping the operation of the computer device by re-executing the instruction that was being executed when the two-bit error was detected.

The technology disclosed in Japanese Patent Application Laid-Open No. 2003-256396 is the technology with which the computer device is able to continue its operation without stopping the operation of the computer device when a failure occurs in the computer device and it is a method in which processor boards are dynamically switched as a preventive maintenance when a correctable failure such as an intermittent failure occurs. Therefore, the technology disclosed in Japanese Patent Application Laid-Open No. 2003-256396 cannot be used when an uncorrectable failure such as a two-bit error occurs. Accordingly, when the uncorrectable failure occurs, it is necessary to perform steps in which the computer device is stopped, a fault processor board is automatically disconnected, and an operation is restarted by using another processor board.

An exemplary advantage according to the invention is that a computer device is able to continue its operation without stopping the operation of the computer device even when an uncorrectable failure occurs.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. A computer device that includes a plurality of processor boards each provided with a processor, a memory, and a chipset, comprising:
   a first processor board that makes erroneous data in a cache of said processor of said first processor board in operation invalid, said erroneous data having become erroneous as a result of an uncorrectable failure which occurs when reading out data from said memory on said first processor board, stores valid data in said cache and information representing an internal state of said processor on said first processor board in said memory on said first processor board, copies all data in said memory on said first processor board, onto said memory on a second processor board, and switches from said first processor board to said second processor board for replacement; and
   said second processor board that fetches said information representing said internal state of said processor on said first processor board from said memory on said second processor board, copies said information onto said processor on said second processor board, and re-executes an instruction that was being executed in said first processor board when said failure occurred with said data read from said memory on said second processor board.

2. The computer device according to claim 1, wherein said first processor board exchanges a setting value in said chipset on said first processor board for a setting value of said chipset on said second processor board and vice versa.

3. The computer device according to claim 1, wherein said first processor board analyzes a log about said failure of said first processor board, identifies the erroneous data in said cache which have become erroneous as a result of said failure, makes the identified data invalid, and then writes all the valid data in said cache into said memory on said first processor board.

4. The computer device according to claim 1, wherein said second processor board fetches said information representing said internal state of said processor on said first processor board that has been copied onto said memory on said second processor board, copies said information onto said processor on said second processor board, rewrites as an instruction execution address for said processor on said second processor board an address specifying said instruction that was being executed in said processor on said first processor board when said failure occurred, and re-executes said instruction.

5. The computer device according to claim 1, wherein
   when a plurality of processors are mounted on said processor board,
   said first processor board stores information representing internal states of said plurality of processors on said first processor board in said memory on said first processor board; and
   said second processor board copies said information representing said internal states of said plurality of processors on said first processor board that is copied onto said memory on said second processor board onto said plurality of processors on said second processor board.

6. A continuing operation method for a computer device that includes a plurality of processor boards each provided with a processor, a memory, and a chipset, comprising:
   making erroneous data in a cache of said processor of said first processor board in operation invalid, said erroneous data having become erroneous as a result of an uncorrectable failure which occurs when reading out data from said memory on a first processor board;
   storing valid data in said cache and information representing an internal state of said processor on said first processor board into said memory on said first processor board;
   copying all data in said memory on said first processor board, onto said memory on a second processor board;
   switching from said first processor board to the second processor board for replacement;
   fetching said information representing said internal state of said processor on said first processor board from said memory on said second processor board;
   copying said information onto said processor on said second processor board; and
   re-executing an instruction that was being executed in said first processor board when said failure occurred with said data read from said memory on said second processor board, on said second processor board.

7. The continuing operation method for said computer device according to claim 6, wherein said switching includes, exchanging a setting value in said chipset on said first processor board for a setting value of said chipset on said second processor board and vice versa.

8. The continuing operation method for said computer device according to claim 6, wherein said making includes, analyzing a log about said failure of said first processor board, identifying the erroneous data in said cache which have become erroneous as a result of said failure, and writing all the valid data in said cache into said memory on said first processor board after making the identified data invalid.

9. The continuing operation method for said computer device according to claim 6, wherein said re-executing includes, fetching said information representing said internal state of said processor on said first processor board that has been copied onto said memory on said second processor board, copying said information onto said processor on said second processor board, and rewriting as an instruction execution address for said processor on said second processor board an address specifying said instruction that was being executed in said processor on said first processor board when said failure occurred to re-execute said instruction.

10. The continuing operation method for said computer device according to claim 6, wherein
    when a plurality of processors are mounted on said processor board,
    said switching includes, storing information representing internal states of said plurality of processors on said first processor board in said memory on said first processor board; and
    said re-executing includes, copying said information representing said internal states of said plurality of processors on said first processor board that is copied onto said memory on said second processor board onto said plurality of processors on said second processor board.

11. A non-transitory computer readable medium embodying a program, said program causing a computer device that includes a plurality of processor boards each provided with a processor, a memory, and a chipset, to perform a method, said method comprising:

making erroneous data in a cache of said processor of said first processor board in operation invalid, said erroneous data having become erroneous as a result of an uncorrectable failure which occurs when reading out data from said memory on a first processor board;

storing valid data in said cache and information representing an internal state of said processor on said first processor board into said memory on said first processor board;

copying all data in said memory on said first processor board, onto said memory on a second processor board;

switching from said first processor board to said second processor board for replacement;

fetching said information representing said internal state of said processor on said first processor board from said memory on said second processor board;

copying said information onto said processor on said second processor board; and re-executing an instruction that was being executed in said first processor board when said failure occurred with said data read from said memory on said second processor board, on said second processor board.

12. A computer readable medium embodying a program according to claim 11, wherein said switching includes, exchanging a setting value in said chipset on said first processor board for a setting value of said chipset on said second processor board and vice versa.

13. A computer readable medium embodying a program according to claim 11, wherein said making includes, analyzing a log about said failure of said first processor board, identifying the erroneous data in said cache which have become erroneous as a result of said failure, and writing all the valid data in said cache into said memory on said first processor board after making the identified data invalid.

14. A computer readable medium embodying a program according to claim 11, wherein said re-executing includes, fetching said information representing said internal state of said processor on said first processor board that has been copied onto said memory on said second processor board, copying said information onto said processor on said second processor board, and rewriting as instruction execution address for said processor on said second processor board an address specifying said instruction that was being executed in said processor on said first processor board when said failure occurred to re-execute said instruction.

15. A computer readable medium embodying a program according to claim 11, wherein
when a plurality of processors are mounted on said processor board,
said switching includes, storing information representing internal states of said plurality of processors on said first processor board in said memory on said first processor board; and
said re-executing includes, copying said information representing said internal states of said plurality of processors on said first processor board that is copied onto said memory on said second processor board onto said plurality of processors on said second processor board.

16. A computer device that includes a plurality of processor boards each provided with a processor, a memory, and a chipset, comprising:
means for making erroneous data in a cache of said processor of said first processor board in operation invalid, said erroneous data having become erroneous as a result of an uncorrectable failure which occurs when reading out data from said memory on a first processor board, storing valid data in said cache and information representing an internal state of said processor on said first processor board into said memory on said first processor board, copying all data in said memory on said first processor board, onto said memory on a second processor board, and switching from said first processor board to the second processor board for replacement; and
means for fetching said information representing said internal state of said processor on said first processor board from said memory on said second processor board, copying said information onto said processor on said second processor board, and re-executing an instruction that was being executed in said first processor board when said failure occurred with said data read from said memory on said second processor board, on said second processor board.

17. A continuing operation method for a computer device that includes a plurality of processor boards each provided with a processor, a memory, and a chipset, comprising:
a step for making erroneous data in a cache of said processor of said first processor board in operation invalid, said erroneous data having become erroneous as a result of an uncorrectable failure which occurs when reading out data from said memory on a first processor board;
a step for storing valid data in said cache and information representing an internal state of said processor on said first processor board into said memory on said first processor board;
a step for copying all data in said memory on said first processor board, onto said memory on a second processor board;
a step for switching from said first processor board to said second processor board for replacement;
a step for fetching said information representing said internal state of said processor on said first processor board from said memory on said second processor board;
a step for copying said information onto said processor on said second processor board; and
a step for re-executing an instruction that was being executed in said first processor board when said failure occurred with said data read from said memory on said second processor board, on said second processor board.

* * * * *